Feb. 27, 1962
C. L. SIEGERT
3,023,398
INFRA-RED RADIATION MONITOR
Filed April 9, 1958
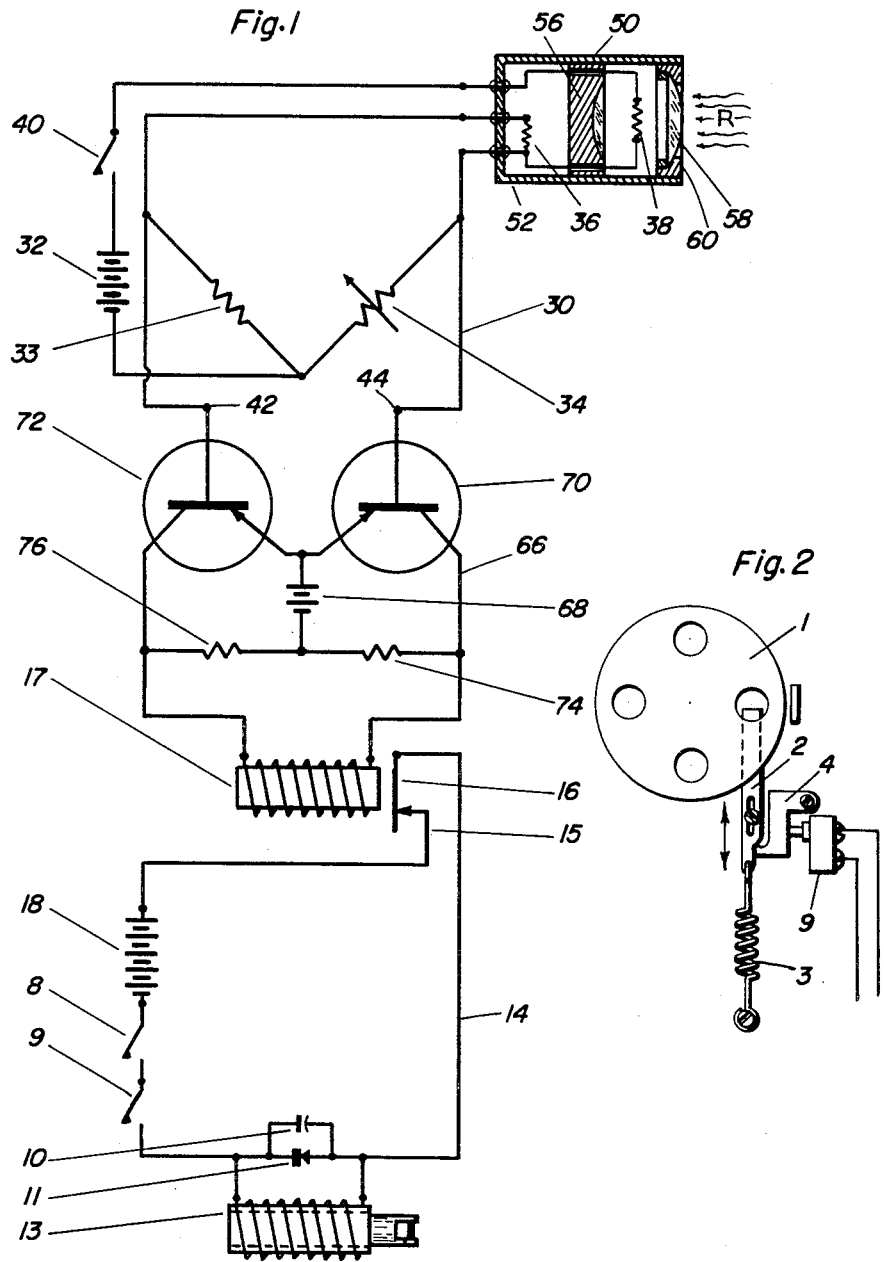
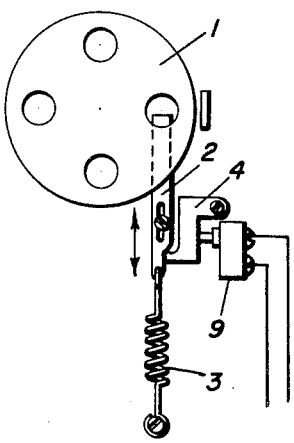
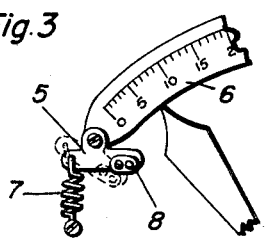
Charles L. Siegert
INVENTOR.
BY *Clarence A. O'Brien*
*and Harvey B. Jacobson*
Attorneys United States Patent Office 3,023,398
Patented Feb. 27, 1962

3,023,398
INFRA-RED RADIATION MONITOR
Charles L. Siegert, Manhattan, Kans.
(229 Byrd Drive, Midwest City, Okla.)
Filed Apr. 9, 1958, Ser. No. 727,449
4 Claims. (Cl. 340—51)

This invention relates to an infra-red radiation detector and more particularly to an infra-red detection apparatus having wide application such as a sensing device for releasing the unexpired time on a parking meter when an automobile leaves the meter parking space, or to measure minute changes in body temperature due to pathological and emotional changes, or to start and stop machines and many others.

In the past there has been developed various equipment for sensing or measuring temperature changes in an area or an object and for doing this by using infra-red detection. Such prior equipment has been quite complicated and expensive. An object of this invention is to provide an infra-red detection apparatus which is exceedingly simple but yet very reliable and which is capable of sensing or measuring the presence or temperature of an object without physical contact with that object. The apparatus is constructed with an electro-mechanical load device that is rendered operative in response to the formation of an unbalanced condition in a Wheatstone bridge and through the intermediate step of an electronic amplifier circuit whose amplifier is energized by the voltage output of the bridge when in the unbalanced condition.

The bridge circuit is known for its stability. The invention apparatus has two legs of the bridge circuit provided with thermal resistors that are each exposed to ambient temperature. However, one thermal resistor is impressed with magnified or concentrated infra-red radiations while the other resistor is shielded from them. This is what causes the previously mentioned unbalanced condition of the bridge to exist.

One of the features of the invention is the manner of mechanically supporting the two legs of the bridge. The thermistors are hermetically sealed in a case and are spaced apart. A reflector, for example a spherical ground mirror, is disposed between the thermistors, and a lens is disposed in front of one of the thermistors. The lens, and spherical mirror, by concentration of infra-red radiations and/or magnification, increase the temperature of one of the thermistors and not the other. The warmer resistor will have a decreased resistance and cause an unbalance of the bridge thereby permitting current to flow from the output of the bridge and to the amplifier or amplifiers of an amplifying circuit. An output signal from the amplifier can be used for any purpose, a principal one of which is to operate a parking meter circuit in such a manner as to remove unused time from the parking meter mechanism and this would be done in response to the impinging of infra-red radiations on one of the thermistors in the previously described case.

The mechanical operation of a parking meter would require the parking of a vehicle adjacent to the parking meter and in line and within the focal length of the lens on the thermistor supporting case. This permits the lens to sense the electro-magnetic, heat and infra-red energy emitted by the vehicle as by driving a vehicle into the metered parking space, as a condition precedent to placing a coin into the meter and obtaining successful operation of the meter. The presence of a radiating body unbalances the temperature sensitive bridge and maintains an open position of the relay and upon the departure of the vehicle, radiation not being present in the quantity referred to, the bridge will return to a balance condition closing the relay and actuating the solenoid causing the meter time indicator to return to zero.

The apparatus of this invention can be operated not only as described above but equally as well for the detection of and the sensing of infra-red radiations and/or temperatures that change. For example, the presence of an automobile in a parking space can be detected by the temperature change which it causes in one of the thermal resistors. This is largely a heat conductivity measurement just as is the case when the apparatus is used for detecting very small changes in human body temperature. Such applications as fire control, fire alarm actuation, burglar alarm operation, ordinance, blind navigation, product quality control that is capable of being sensed by radiation and others have a practical need for and practical use with the described invention.

Other objects and features of importance will become apparent in following the description of the illustrated form of the invention.

FIGURE 1 is a schematic view showing the several circuits of the invention.

FIGURE 2 is a fragmentary schematic view showing a parking meter bad coin detection mechanism and switch.

FIGURE 3 is a fragmentary view showing a parking meter graduated scale, pointer and switch operated by the meter, the switches of FIGURES 2 and 3 shown in the parking meter portion of the circuitry in FIGURE 1.

In the accompanying drawing there are fragmentary portions of a parking meter to show one possible application of the infra-red radiations and/or small temperature differential detection apparatus. FIGURE 2 has coin carrier 1 near the coin slot. Should the parking meter receive a slug or bent coin, the slide 2 will be operated against the bias of spring 3 and this will cause switch 9 to remain open by movement of bell crank 4. When the coin carrier 1 is in the normal operating position, switch 9 is closed. This switch 9 is operated in sequence with switch 8 (FIGURES 1 and 3) carried by a rocker 5 that is pivoted on a part of the parking meter, for example graduated scale 6. Switch 8 is a mercury switch that is closed when and during the time that the parking meter is actuated. When the parking meter is returned to zero time and the hand of the parking meter returns, rocker 5 is tilted against the yielding opposition of spring 7 and switch 8 is opened.

The final connection with the parking meter is made by an electro-mechanical device such as solenoid 13 whose armature is mechanically connected with the reset mechanism of the parking meter. Solenoid 13 constitutes a part of parking meter circuit 14 that is constructed of a main switch 15 which may assume several forms, one of which is a relay that has armature 16 operated by coil 17. Circuit conductors extend from the terminals of the main switch 15 and connect to solenoid 13. A source of electrical energy, such as battery 18 is serially connected with the two switches 8 and 9 and to solenoid 13.

Diode 11 and capacitor 10 as shown are for the purpose of suppressing the current flow back across the points of the relay. The diode is arranged as to prevent current flow back.

Reference is now made principally to the detection and control circuit 30 by which the parking meter circuit 14, representing a typical application for circuit 30, is operated. The circuit 30 is made of a Wheatstone bridge that has four legs operatively connected with a source 32 of electric current. One leg of the bridge has a known resistance 33 while another leg has a variable resistance 34 to null the bridge. The other two legs of the bridge have thermal resistors or thermistors 36 and 38 that constitute the detection elements of the bridge circuit. A main switch 40 is in circuit 30 to control the energization of the bridge. Output terminals 42 and 44 of the bridge are connected to the single illustrated amplifier section or circuit of the complete circuit 30.

Thermistors 36 and 38 constitute a part of a cell 50 whose specific construction represents an advance in the type of equipment under consideration. The cell 50 is made of a casing 52 that is hermetically sealed. It has the two thermistors that form legs of the bridge located in it and spaced apart. A radiation reflector 56, which may be a spherical mirror, is attached to the side wall of casing 52 and mounted between the thermistors 36 and 38. Optical lens 58 is supported by a ring 60 in the open end of casing 52 so that infra-red radiations passing into the case 52 must pass through the lens 58 and be magnified and/or concentrated on thermistor 38 to increase its temperature level. The lens 58 and its ring 60 not only serve this purpose but they also function as a closure for case 52 to preserve the hermetic seal. Accordingly, the two thermistors are exposed always to the same ambient temperature, but thermistor 36 is shielded from the infra-red radiations. Moreover, thermistor 38 is hyper-exposed to the infra-red radiations in the sense that they are concentrated thereon.

When an unbalance condition of the bridge exists due to the comparative change in heat level between the thermistors 36 and 38, the bridge has an output taken from terminals 42 and 44 and this is amplified by the amplifier circuit 66 before application to the coil 17. This coil is part of a relay whose function has been previously described. The relay represents a load connected to the amplifying circuit 66 and actuated in response to and by the energy output of the amplifying circuit.

Amplifying circuit 66 has a source of electrical potential, for example battery 68, and two amplifiers 70 and 72. The amplifiers are shown as transistors, although it is understood that vacuum tubes, such as pentodes, could be substituted. In either case, the source 68 has one terminal provided with a pair of split leads in which voltage limiting resistors 74 and 76 are connected. The split leads are attached at their ends to the output terminals of the transistors and to the load 17. The other terminal of the source 68 is attached operatively to the emitters of the transistors or to the corresponding terminals of the vacuum tubes in the case of a tube circuit. The amplifier circuit can be non-conductive until an output is received from terminals 42 and 44 of the bridge circuit or, the amplifier circuit 66 can be conductive at all times but have its output increased in response to an output at terminals 42 and 44. In either case, the additional output from the bridge will be responsible for the actuation of the electro-mechanical load device represented by relay 15.

The general operation is the unbalancing of the bridge by the increase in temperature of one of the thermal resistors with respect to the other of the thermal resistors. This can be achieved by proximity to a body by infra-red radiations that are concentrated on one of the two thermal resistors. When the Wheatstone bridge becomes unbalanced, an output is received from its terminals 42 and 44 and this output is impressed on the two transistors 70 and 72.

The transistors function as amplifiers in an amplifying circuit having its own source of electrical potential. Although there is only a two stage amplification illustrated and described, further stages of amplification could be used for operating other devices or for aiding in the actuation of the electro-mechanical load device 15.

When the relay serving as the electro-mechanical load device in the parking meter application, is closed, circuit 14 conducts provided that switches 8 and 9 are closed. This indirectly causes the parking meter to be reset to zero and places it in condition for subsequent cycles of operation.

It is understood that various changes, modifications and rearrangements of parts may be made without departing from the following claims.

What is claimed as new is as follows:

1. An infra-red radiation detection apparatus to signal changes in the presence of infra-red energy, said apparatus including a control circuit having a bridge provided with an electrical source and four legs, two of said legs having a first and a second thermal resistor respectively which at ambient temperature retain said bridge in balance, means mounting said resistors and exposing each to the same ambient temperature atmosphere, means for magnifying the changes in infra-red energy falling on said first resistor, means for shielding said second resistor, said shielding means including a spherical mirror supported between said thermal resistors by said mounting means whereby said changes will unbalance said bridge and provide an electrical output from the bridge, said bridge having a pair of output terminals, an amplifying circuit which has a first and a second amplifier connected respectively with the bridge terminals to energize said amplifiers in response to bridge unbalance, and amplifier electric source in said amplifying circuit, said amplifying circuit having output conductors, and an electro-mechanical load device connected to said output conductors.

2. The infra-red detection apparatus of claim 1 wherein said electro-mechanical load device includes a solenoid arranged to operate a main switch of a parking meter circuit, said circuit being separate from the amplifying circuit and including a parking meter switch which is mechanically actuated by a part of a parking meter, an electrical source, said parking meter switch connected in series with said main switch, and electrical means for releasing unexpired time from the parking meter, said resistor mounting means including a casing, said first and said second resistors mounted in said casing, said magnifying means including a lens in front of said first resistor, and said mirror being located behind said first resistor.

3. The combination of a radiant heat responsive device connected to a parking meter reset control circuit, said radiant heat responsive device including a bridge circuit having two legs, a thermal resistor in each leg exposed to the same ambient heat, one of said resistors being shielded from radiant heat by shielding means, the other resistor being located so as to be exposed to heat radiating from any vehicle parked adjacent a parking meter controlled by said reset control circuit, said reset control circuit including a switch operated by electric power means, means connecting said power means to said bridge circuit, said bridge circuit becoming unbalanced when said other resistor is heated by radiant heat so as to supply electric energy to said power means for operating said switch to reset the meter.

4. A device as defined in claim 3 wherein said shielding means comprises a housing containing said resistors, a mirror in said housing separating said resistors, a magnifying lens in one end of said housing and on the opposite side of said other resistors as said lens, said lens arranged so as to focus said heat from the vehicle on said other resistor and said mirror, said mirror arranged to also focus said heat on said other resistor.

References Cited in the file of this patent

UNITED STATES PATENTS

| 1,099,199 | Parker | June 9, 1914 |
| 1,639,411 | Mechau | Aug. 16, 1927 |
| 2,623,933 | Allstadt | Dec. 30, 1952 |
| 2,632,885 | Barclay | Mar. 24, 1953 |
| 2,826,072 | Kliever | Mar. 11, 1958 |
| 2,859,402 | Schaeve | Nov. 4, 1958 |

FOREIGN PATENTS

| 58,421 | France | June 24, 1952 |
| | (1st addition to 950,577) | |